United States Patent [19]

Platz

[11] Patent Number: 5,034,195

[45] Date of Patent: Jul. 23, 1991

[54] APPARATUS FOR GAS PHASE POLYMERIZATION OF OLEFINS IN VERTICALLY STACKED REACTORS

[75] Inventor: Gerald M. Platz, Conroe, Tex.

[73] Assignee: Brown & Root USA, Inc., Houston, Tex.

[21] Appl. No.: 273,969

[22] Filed: Nov. 18, 1988

[51] Int. Cl.⁵ .............................................. B01J 8/18
[52] U.S. Cl. .................................. 422/134; 422/131; 422/139; 422/142; 422/143; 422/145; 422/147; 239/583
[58] Field of Search ............... 422/131, 134, 139, 141, 422/142, 143, 145, 147; 526/66; 55/546; 209/144, 211; 239/583; 251/121, 122, 324; 431/7; 122/4 D; 110/245

[56] References Cited

U.S. PATENT DOCUMENTS

| | | | |
|---|---|---|---|
| 1,152,604 | 9/1915 | Coll | 251/122 |
| 2,761,769 | 9/1956 | Elder | 422/143 |
| 2,909,423 | 10/1959 | Jukkola | 422/141 X |
| 4,048,412 | 9/1977 | Caumartin et al. | 526/66 |
| 4,198,302 | 4/1980 | Johansson | 209/211 |
| 4,200,715 | 4/1980 | Lynch et al. | 422/131 |
| 4,333,608 | 6/1982 | Hendry | 239/583 |
| 4,429,471 | 2/1984 | Goodstine et al. | 34/57 B |
| 4,888,156 | 12/1989 | Johnson | 422/144 |

Primary Examiner—Robert J. Warden
Assistant Examiner—D. John Griffith, Jr.
Attorney, Agent, or Firm—Vinson & Elkins

[57] ABSTRACT

A method and apparatus are disclosed for producing polyolefins by a fluidized gas phase polymerization process utilizing two stacked, substantially vertically aligned, reactors and a substantially vertical product transfer line for transfer of intermediate polyolefin polymer product from the polymerization zone of the upper reactor to the polymerization zone of the lower reactor. This abstract shall not be construed to define or limit in any way the scope of the invention, which is measured solely by the appended claims.

12 Claims, 3 Drawing Sheets

APPARATUS FOR GAS PHASE POLYMERIZATION OF OLEFINS IN VERTICALLY STACKED REACTORS

BACKGROUND OF THE INVENTION; PRIOR ART

The present invention relates to the production of polyolefins in a multiple stage fluidized bed gas phase polymerization system.

The use of gas phase fluidized bed polymerization systems in the production of polyolefins is well known in the prior art, as shown, for example, by U.S. Pat. Nos. 3,023,203, 4,003,712, and 4,588,790. In such systems, gaseous alpha-olefins typically having two to twelve carbon atoms, and more particularly ethylene and/or propylene are introduced into a reactor having a plenum, a polymerization zone and a disengaging zone. A fluidizing gas mixture comprising the alpha-olefin is supplied to the plenum of the reactor, from which the gas travels upwardly through a gas distribution plate into the reactor polymerization zone. Prior art gas distribution plates are flat and have a plurality of ports therein to distribute the flow of polymerization gas across the cross-sectional area of the reactor. A polymerization catalyst, comprising a single catalyst or a combination of catalysts, simultaneously is introduced into the polymerization zone. Large numbers of suitable catalysts are shown in the prior art. See, for example, U.S. Pat. Nos. 4,302,566, 4,303,771, 4,383,095, and 4,427,573.

At start-up, the polymerization zone of the reactor is pre-charged with a bed of polyolefin product particles. This polymer bed is maintained in a fluidized state by the polymerizable gas/catalyst mixture rising upwardly therethrough. During operation of the reactor, new polymer product continuously is formed by the catalyzed polymerization of the olefin gas and product continuously is withdrawn to maintain the fluidized polymer product bed at a substantially constant level. The withdrawn product moves into purge hoppers and storage bins, where any unreacted alpha-olefins gas is purged by a sweeping flow of an inert gas, such as nitrogen. The inert gas and the unreacted alpha-olefins may be vented, flared to the atmosphere or recycled to the reactors as illustrated in U.S. Pat. No. 4,666,998.

Unreacted gas exiting from the top of the fluidized bed of polymer flows upwardly through a disengaging zone in the upper part of the reactor. A recycle stream containing unreacted alpha-olefins, along with any entrained solid polyolefin polymer and catalyst typically is withdrawn from the upper part of the disengaging zone and recycled to the plenum of the reactor after being run through a cyclone to remove particulate matter and then cooled and compressed. In prior art reactors, the disengaging zone normally is larger in diameter than the polymerization zone, so as to reduce the gas flow velocity and thereby facilitate the settling out of solid particulates.

It has been shown in the prior art that gas phase polymerization of alpha-olefins can be conducted in multiple stages. See, for example, U.S. Pat. Nos. 2,936,303, 4,048,412, 4,338,424, 4,390,669, 4,420,592, and 4,703,094 all of which disclose multiple stage polymerization systems. In such multi-stage processes, each individual stage typically is similar in basic design and operation to the gas phase polymerization system described above. The multiple stages typically are arranged in such a fashion as to require lengthy transfer lines or other complex means for transferring intermediate polyolefin polymers from one reactor to another, resulting in increased fabrication costs and an increased frequency of plugging in the intermediate polymer transfer lines. Frequent plugging in turn increases the system's operating cost.

OBJECTS OF THE INVENTION

It is the primary object of the present invention to provide an improved method and apparatus for production of polyolefins in multi-stage fluidized bed reactors.

Another object is to provide such a method and apparatus in which operating problems experienced by prior art multi-stage systems are reduced and in which the apparatus may be built and operated more economically than prior art systems.

A still further object is to provide such an improved method and apparatus which utilizes stacked reactors in substantially vertical alignment with one another in order to reduce construction and operating costs, improve operating performance and improve operating versatility of the system.

A still further object of the present invention is to provide a dual reactor gas phase polymerization system which is capable of producing a broad spectrum of polyolefin polymers, including the capability of simultaneously producing two different polyolefin polymers.

BRIEF DESCRIPTION OF THE DRAWINGS

These and other objects and advantages of the present invention will be apparent from the following disclosure and description thereof. In the accompanying drawings, in which like numerals indicate like parts.

DESCRIPTION OF THE PREFERRED EMBODIMENT

Figure 1:
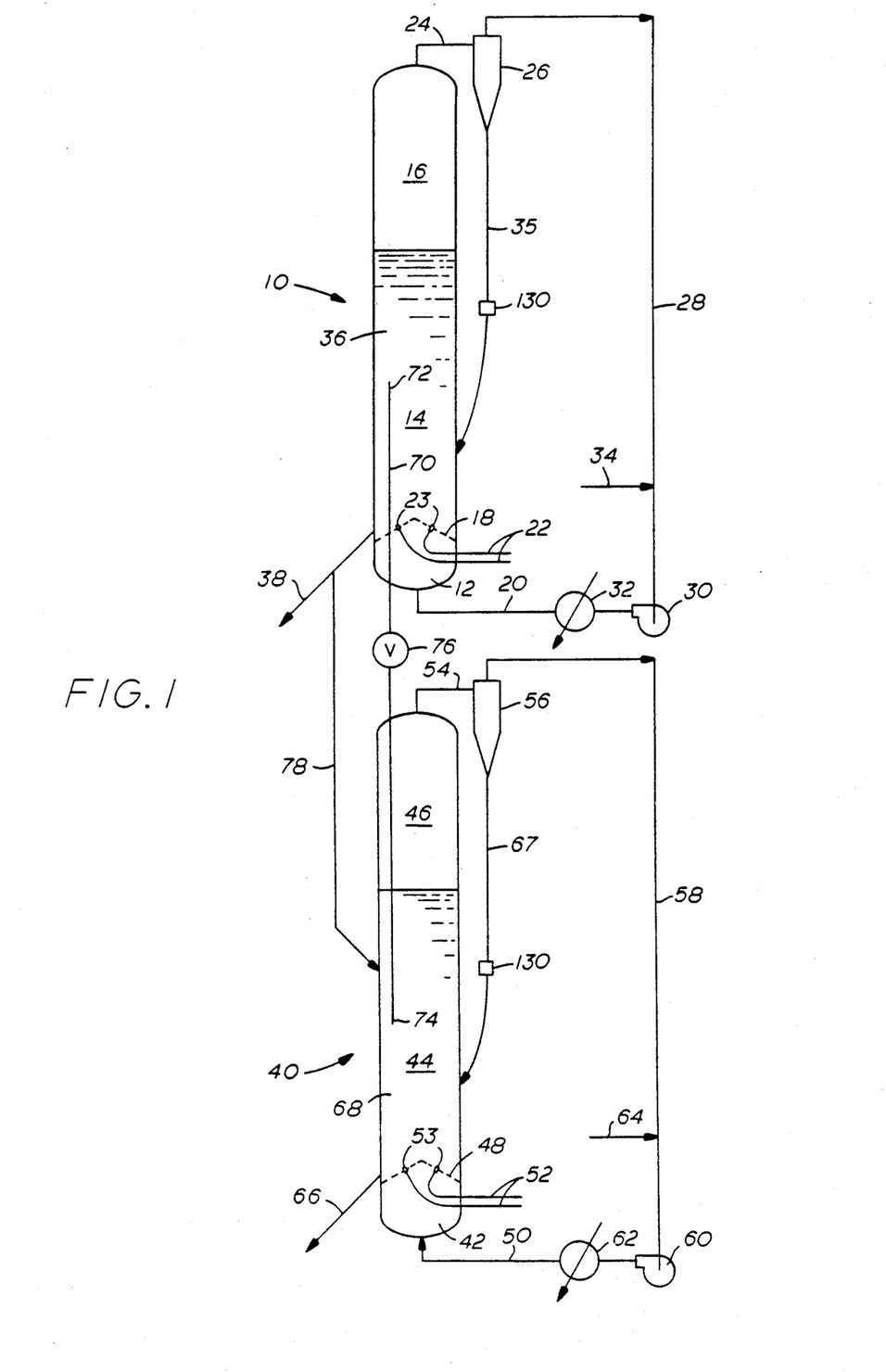
FIG. 1 is a somewhat diagrammatic illustration of dual vertically stacked gas phase polymerization reactors and associated equipment in accordance with the present invention.

Referring now to FIG. 1, there are illustrated two vertically stacked polymerization reactors in accordance with the present invention. A first, generally cylindrical, reactor vessel 10 is provided and includes a first plenum zone 12 in the lower portion thereof, a first polymerization zone 14 located above the first polymerization zone and a first disengaging zone 16 located above the first polymerization zone. A first gas distribution means comprising a conical gas distribution plate 18, is located between, and divides, the first plenum zone from the first polymerization zone. The reactor 10 is of substantially uniform internal diameter throughout substantially its entire vertical length. A gas supply conduit 20 is provided for supplying polymerization gas to the lower end of the plenum zone of the first reactor. Catalyst supply conduits 22 and catalyst injection nozzles 23 provide means for supplying polymerization catalyst through the conical gas distribution plate 18 and into the first polymerization zone 14.

A first recycle means is provided for withdrawing a gas stream comprising unreacted polymerizable gas from the upper portion of the first disengaging zone 16 and supplying it as a first recycle stream to the first plenum zone 12. In the preferred embodiment, these comprise a gas discharge conduit 24 for withdrawing a stream of gas from the upper portion of the first reactor 10 and supplying the same to a first cyclone 26 provided externally of the reactor. In the cyclone 26, particulate matter is removed from the gas stream and resupplied to the polymerization zone through a first dip tube 35. Such gas stream, with particulate matter removed by the cyclone, may then be supplied as a first recycle stream through recycle line 28, compressor 30, heat exchanger 32, and gas supply conduit 20 into the bottom of the first plenum zone 12. A feed supply line 34 is provided for supplying makeup feed of polymerization gas into the recycle line 28 upstream of the compressor 30.

Particulate polyolefin products, represented by the bed 36 of intermediate polyolefin product contained in the first polymerization zone of the first reactor may be withdrawn through first product removal line 38.

A second generally cylindrical reactor vessel 40 of substantially uniform internal diameter is provided immediately below, and substantially in vertical alignment with, the first reactor vessel 10. The second reactor vessel 40 and its associated equipment substantially duplicate the upper reactor vessel and include a second plenum zone 42, second polymerization zone 44, second disengaging zone 46, second conical gas distribution plate 48, gas supply conduit 50, catalyst supply conduits 52, catalyst injection nozzles 53, gas discharge conduit 54, cyclone 56, recycle line 58, compressor 60, heat exchanger 62, feed supply line 64, and product removal line 66. A second bed of polymer product 68 is contained in the polymerization zone of the second reactor vessel 40.

Although, in the preferred embodiment, the invention comprises the use of two separate reactor vessels, it will be appreciated by those skilled in the art that the invention also may be practiced using more than two separate reactors or by utilizing the functional equivalent of two or more reactors contained in a single enclose or housing.

The first and second reactors 10 and 40 differ from conventional design in that they are of substantially uniform internal diameter throughout their entire lengths. In prior art reactors the disengaging zone generally is of an increased internal diameter so as to produce reduced gas flow velocity and permit entrained particulate matter to drop from the gas in the disengaging zone before it exits the top of the reactor. However, in accordance with the present invention it has been discovered that adequate separation of gas and particulate matter may be obtained in a disengaging zone having the same diameter as the polymerization zone, particularly when used in conjunction with cyclone apparatus for separating any remaining particulate matter from the gas recycle stream before it is reintroduced into the plenum zone. The use of reactors having substantially uniform internal diameters thus can help minimize fabrication costs for such reactors, as compared to those having enlarged diameter disengaging zones, without adversely affecting process conditions.

The two reactors 10 and 40 may be operated in parallel to produce, simultaneously, the same or two different polyolefin products, depending upon the polyolefin feed stock and catalyst provided and the temperature, pressure and other conditions maintained inside the reactors. However, in the preferred embodiment of the method and apparatus of present invention, the reactors are operated in series so that polymer product produced in the polymerization zone in the first reactor continuously is transferred to the second polymerization in the second reactor 40 for further co-polymerization therein to produce specific polyolefin polymer products. The series operation of multi-stage polyolefin reactors is known in the prior art. However, in the prior art systems, the first and second reactor vessels have been disposed in tandem horizontal arrangements, in offset (non-vertical) arrangements or in other arrangements requiring lengthy non-vertical transfer lines or other means for transferring intermediate polymer product from the polymerization zone of the first reactor to the polymerization of the second reactor. In accordance with the preferred embodiment of the present invention, however, the first and second reactor vessels are disposed in substantially vertical alignment permitting direct vertical transfer by gravity flow of the intermediate polymer product from the first to the second polymerization zones. For this purpose, there are provided substantially vertical intermediate product transfer means for withdrawing intermediate polymer product from the polymerization zone of the first reactor and supplying the withdrawn intermediate polymer product to the polymerization zone of the second reactor. As shown in FIG. 1, these comprise the vertical, generally cylindrical, intermediate product transfer line 70 having its inlet 72 located in the first polymerization zone 14 and its outlet 74 located in the second polymerization zone 44. A transfer control means comprising valve 76 is provided for controlling the flow of intermediate polymer product through the product transfer line.

It is believed that the placement of the first reactor substantially in vertical axial alignment above the second reactor and the use of the substantially vertical intermediate product transfer means makes possible improved operating characteristics for the system by minimizing the transfer distance and product transit time between the first and second polymerization zones, by making possible the direct gravity flow of intermediate polymer product vertically from the first to the second polymerization zone and by reducing the tendency of prior art systems to form polymer plugs or obstructions in the transfer lines between the first and second polymerization zones.

Any obstruction in the intermediate product transfer line, including any curves or any other deviation from a substantially vertical orientation, and any unnecessary extension of the intermediate product transfer line, decreases the rate of transfer from the first to the second reactor and increases the frequency of plugging in the intermediate product transfer line. Since the polymerization of the alpha-olefins occurring in the first reaction zone 14 continues, to some extent, to take place as the intermediate polyolefin polymer, and some associated polyolefin gas and catalyst, are transferred from the first to the second reactor, plugging in product transfer lines is common in gas phase polymerization systems discussed in the prior art. This plugging causes system down time, lost final product and raw materials, and increased operating costs. The gas phase polymerization system of the present invention minimizes the opportunity for plugging in the intermediate transfer means by eliminating sites where the polyolefin polymer can begin to accumulate. Thus, in the preferred embodiment, the intermediate product transfer line 70 is substantially vertical in orientation and free of any bends or other obstruction except for the single valve means 76.

If desired, additional means may be provided in the product transfer line, such as the helical screw conveyors discussed below, for aiding the flow of intermediate polymer product between the first and second polymerization zones.

As a further safety measure in the event of polymer plugs or obstructions developing in the intermediate product transfer line during operation, there are provided auxiliary product transfer means comprising auxiliary transfer line 78 communicating between the first product removal line 38 and the second polymerization zone 44. In the event that the vertical intermediate product transfer line 70 becomes plugged or obstructed for any reason, or if an intermediate product flow rate beyond the capacity of the transfer line 70 is desired, then intermediate polymer product could be withdrawn from the first reaction zone through product removal line 38 and auxiliary product transfer line 78 and continuously supplied to the second polymerization zone 44 to permit continued operation of the system.

Figure 2:
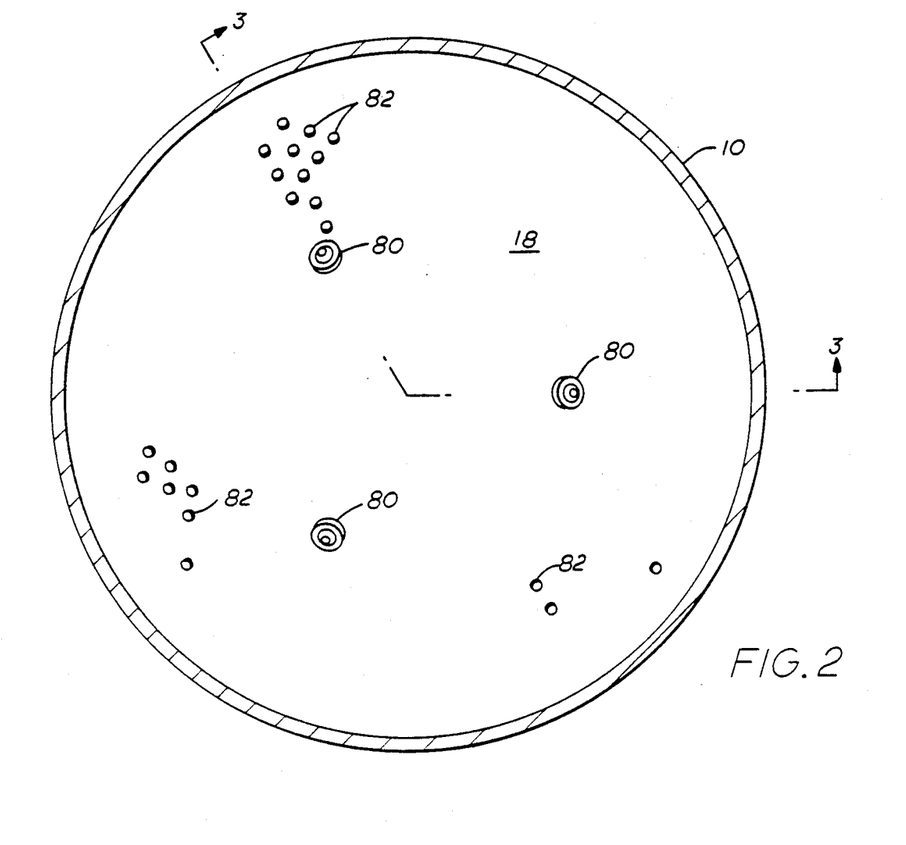
FIG. 2 is a plan view of the improved conical gas distribution plate for the reactors in accordance with the present invention.
Figure 3:
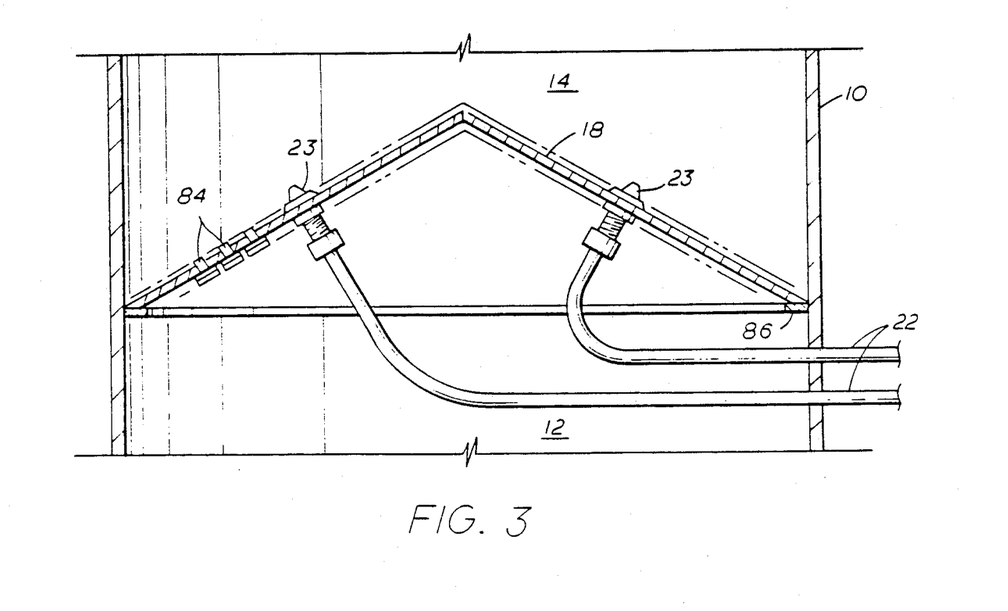
FIG. 3 is a view in vertical section of the distribution plate of FIG. 2 taken along lines 3—3 of FIG. 2.

Referring now to FIGS. 2 and 3, there are shown details of the conical distribution plate 18. The distribution plate is formed in a conical shape and is positioned inside the reactor with its apex pointing upwardly. A plurality, preferably 3, of spaced openings 80 (FIG. 2) are provided for insertion through the distribution plate of an equal number of catalyst injection nozzles 23 (FIG. 3). A large number of additional regularly-spaced openings 82 (FIG. 2) are provided in the distribution plate for insertion of a like number of port flow controllers 84 (FIG. 3). Although only a few such openings 82 and port flow controllers 84 are illustrated in FIGS. 2 and 3, it will be appreciated if a very large number of port flow controllers, up to several thousand depending on reactor diameter in some cases, may be installed in the distribution plate 18.

Each of the catalyst injection nozzles 23 preferably is connected to an individual catalyst supply conduit 22. The port flow controllers 84, however, are in open communication with the plenum zone 12 of the reactor and merely serve to regulate and distribute gas flowing upwardly from the plenum zone, through the port flow controllers and into the polymerization zone 14. It will be appreciated that while FIGS. 2 and 3 illustrate the conical distribution plate in the first reactor vessel 10, the conical distribution plate, gas injection nozzles and port flow controllers in the second reactor vessel 40 are of identical construction.

The conical distribution plates of the present invention have several advantages over the flat distribution plates used in prior art reactors. First, the conical shape provides greater structural strength to support the bed of polyolefin polymer in the reactor above the distribution plate. While the reactor is in operation, the bed of polymer product is substantially fluidized and presents a relatively low load factor. However, when the process is interrupted, the weight of the polymer bed must be supported entirely on the distribution plate dividing the plenum and polymerization zones of the reactor. In prior art reactors, use of flat distribution plates has necessitated support beams or other structural support members extending under the distribution plate and across the diameter of the reactor in order to carry this load. However, with the conical construction, the necessity for such transverse structural support members is eliminated and the conical distribution plate may be supported entirely by a mounting ring 86 or the like welded to the inside reactor wall.

The conical shape of the distribution plate 18 also provides a greater surface area within the cross-sectional diameter of the reactor vessel, than would a flat circular distribution plate of equal diameter. This increased surface area makes possible the installation of a larger number of port flow controllers 84 for even distribution of the polymerization gases flowing upwardly through the distribution plate and into the polymer bed. This, in turn, improves the polymerization reaction by increasing the contact between the polymerizable gas and the catalyst. Better gas flow distribution through the fluidized bed also improves the capacity of the gas to remove heat of polymerization generated by the exothermic polymerization reaction and helps to insure that no "dead spots" are created inside the polymer bed which can lead to the agglomeration of polymer products and reduced overall operating efficiency. Finally, the conical distribution plate provides additional access area within the plenum 12 for facilitating maintenance operations in this area.

Figure 4:
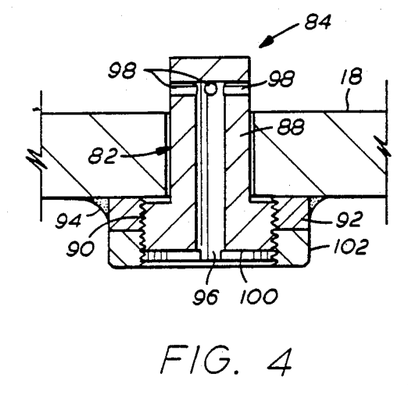
FIG. 4 is an enlarged detail view in vertical section illustrating one of the port flow controllers used in the conical distribution plate of FIG. 2 to control flow of the polymerization gas from the plenums to the polymerization zones of the reactors.

Referring now to FIG. 4, there is shown in greater detail the construction of one of the port flow controllers 84. The port flow controller includes a body 88 formed of suitable material such as cast metal. The body 88 has an upper portion of generally cylindrical shape and with a diameter slightly less than that of one of the openings 82 in the distribution plate 18 and a length slightly greater than the thickness of the distribution plate 18. The lower portion of the body 18, also preferably of cylindrical shape, has threads 90 formed along its outer edge for threaded engagement with a mounting nut 92 welded at 94 to the underside of the distribution plate 18. The port flow controllers thus may be threadedly installed and removed from the underside of the conical gas distribution plate which is accessible through the plenum zone 12.

A central vertical bore 96 is provided through the body of the port flow controller and communicates with four radial and substantially horizontal discharge ports 98 through which gas may be directed substantially parallel to the surface of the distribution plate 18. The diameter and orientation of the discharge ports 98 preferably are such as to preclude back flow of polymer product through the discharge ports when the flow of process gas is interrupted. Although four discharge ports 98 are illustrated, it will be appreciated that a larger or smaller number of discharge ports may be utilized. An adjusting slot 100 provides means of insertion of a tool, such as a screwdriver, for orienting the discharge ports 98 as desired so as to properly distribute the flow of process and fluidizing gas across the surface of the distribution plate 18. A locknut 102 is used to lock the port flow controllers in position once their installation and orientation are completed.

Figure 5:
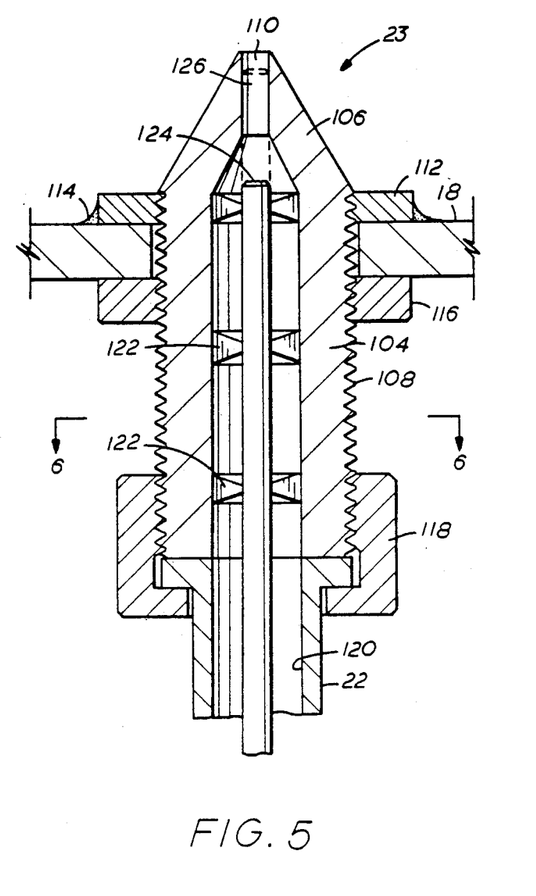
FIG. 5 is an enlarged detail view in vertical section of one of the catalyst nozzles used for supplying particulate polymerization catalyst to the reaction zones of the reactors.

Referring now to FIG. 5, there is shown in enlarged detail construction of one of the catalyst injection nozzles 23. The nozzle comprises an elongated, generally cylindrical, body 104 terminating in a generally conical upper portion 106. The cylindrical portion of the body has exterior threads 108 formed along its outer cylindrical surface. A central bore 120 extends vertically through the body and communicates with a catalyst discharge orifice 110.

Figure 6:
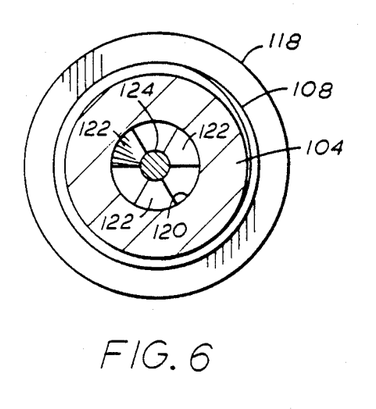
FIG. 6 is a sectional view taken along lines 6—6 of FIG. 5 illustrating details of the catalyst nozzle construction.

The external threads 108 permit the catalyst nozzle body to be threadedly engaged with a mounting nut 112 suitably fastened as by weld 114 to the upper surface of the gas distribution plate 18. Lock nut 116 may be threaded onto the body to lock it into position. The end of a catalyst supply conduit 22 is aligned with the central bore 120 and a coupling nut 118 is used to hold the catalyst supply conduit in position. Catalyst supplied through conduit 22 thus may pass through the bore of the catalyst nozzle and exit through the discharge orifice into the polymerization zone of the reactor. In order to selectively control the flow of particular catalyst into the polymerization zone, and to close the catalyst discharge orifice 110 when no catalyst is being supplied and in order to prevent back flow of polyolefin product and process gases, there are provided valve means in connection with the catalyst injection nozzles 23. In the preferred embodiment, these comprise a slide wire 124 of a diameter to fill and close the catalyst discharge orifice 110. The elongated slide wire 124 extends up through the center of catalyst nozzle bore 120 and is held in position by centering guides 122. A plurality of such centering guides, each of generally truncated conical configuration, are suitably radially distributed around the periphery of the bore 120 (FIG. 6) so as to retain the slide wire in centered position while not blocking the flow of catalyst through the nozzle. The slide wire 124 is connected to a control means (not shown) for selectively extending and withdrawing the slide wire so as to open and close the catalyst nozzles as desired during operation of the system and to provide for intermittent supply of catalyst. With the slide wires retracted, as shown in FIG. 5, the nozzles are open permitting catalyst flow up through the bore 120 and out through nozzle orifice 110. With the wires extended, as illustrated by the dotted line 126, the nozzle orifices are obstructed.

The catalyst injection nozzles and port flow controllers may be installed and removed from the bottom side of the distribution plate 18 through the plenum zone access area, thus permitting maintenance and replacement of these ports without the need to remove the bed of polyolefin product from the polymerization zone of the reactor.

Figure 7:
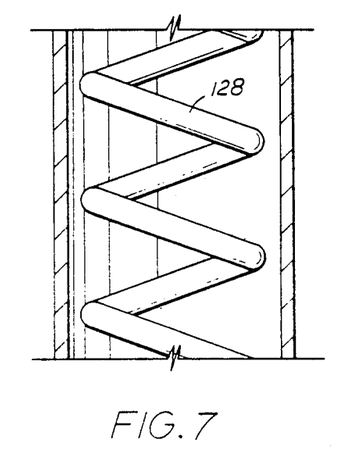
FIG. 7 is an enlarged detail view in vertical section of the "dip tubes" associated with the particulate recovery system for the reactors, illustrating the helical conveyor utilized for assisting flow of dry particulate matter through the dip tubes.

Referring now to FIG. 7, there is illustrated the helical conveyor preferably utilized in the dip tubes 35 and 67 (FIG. 1) to assist in the flow of particulate matter separated from the recycle gas streams by cyclones 26 and 56 (FIG. 1). The helical conveyor comprises an elongated helical member 128 disposed inside the dip tubes and operatively connected to a rotatable power source such as motor 130 (FIG. 1) for rotating the helical member. The effect is to assist the movement of particulate matter downwardly in the dip tubes and to prevent plugging. If desired, such helical conveyors also may be utilized on other particulate matter transfer lines such as the product removal lines 38 and 66, the vertical intermediate product transfer line 70, the auxiliary product transfer line 78, the catalyst supply lines, etc.

In the preferred method of operation of the dual vertically stacked reactor system, a first fluidizing medium comprising in part one or more polymerizable alpha-olefin gases having 2 to 12 carbon atoms is introduced through the feed supply line 34 and gas supply conduit 20 into the plenum zone 12 of the first reactor. In addition to the polymerizable alpha-olefins, the fluidizing medium may contain hydrogen gas to act as a molecular weight modifier for the resulting polyolefin polymer product and/or an inert gas such as nitrogen, to maintain sufficient upward velocity of the fluidizing medium for fluidizing the polymer bed. From the plenum zone 12, the fluidizing medium flows upwardly through the plurality of port flow controllers 84 in the conical distribution plate 18 and into the first polymerization zone 14. In the polymerization zone, the upward flow of fluidizing medium is sufficient to fluidize the intermediate polymer product bed 36. Upon start-up, it is customary to precharge the reactor with a bed of polymer product which may be the same as that desired from the current process run. Once the process is operating continuously, the polymer bed will be self-sustaining.

Simultaneously, a first polymerization catalyst is introduced through catalyst supply conduits 22 and catalyst supply nozzles 23 into the fluidized polymer bed for flow upwardly therethrough along with the fluidizing gas. The catalyst serves to catalyze the formation of additional intermediate polyolefin polymer product in the bed 36. The finely divided particulate catalyst is substantially consumed in the polymerization process by becoming trapped within the particles of intermediate polymer product as they are formed. The fluidizing gas, containing any unreacted olefin gas, exits at the top of the intermediate product bed 36, passes upwardly through the disengaging zone 16 and exits the reactor through the gas discharge conduit 24 into the first cyclone 26. Some particulate matter, including particles of polymer and unconsumed catalyst particles will be entrained in the fluidizing gas as it exits the top of the intermediate polymer product bed. Some of this particulate matter will fall back onto the polymer bed as the fluidizing gas passes upwardly through the disengaging zone. Any remaining particulate matter will be separated from the gas in the first cyclone 26 and returned through dip tube 35 to the intermediate polymer bed 36. A first recycle stream of the fluidizing gas, now substantially free of particulate matter, passes through the first recycle line 28, compressor 30 and heat exchanger 32 and is resupplied to the plenum 12 through the gas supply conduit 20. The heat exchanger 32 is used to remove heat from the recycle stream generated by the exothermic heat of polymerization within the intermediate polyolefin product bed 36. The amount of heat removed by the heat exchanger 32 may be used to control the process temperature inside the reactor.

As the continuous reaction proceeds, the intermediate polymer product formed in the polymerization zone of the first reactor 10 continually is withdrawn through the vertical intermediate product transfer line 70 and supplied to the polymerization zone 44 of the second reactor 40. A second fluidizing medium comprising in part a polymerizable gaseous mixture of one or more alpha-olefins is supplied to the second reactor plenum zone 42 through feed supply line 64 and second gas supply conduit 50. It passes upwardly through the plenum zone 42 and the port flow controllers 84 of the second conical distribution plate 48 to enter the polymerization zone 44 of the second reactor. There it serves to fluidize the bed of final polymer product 68 in the second reactor.

A second polymerization catalyst simultaneously is introduced into the second polymerization zone 44 through catalyst supply conduits 52 and catalyst injection nozzles 53. The second catalyst catalyzes polymerization of the polyolefins in the second fluidizing medium in the presence of the intermediate polyolefin product to produce the final polyolefin product.

The second fluidizing medium, containing any unreacted alpha-olefin gas, exits the top of the final polymer product bed 68, passes upwardly through the second disengaging zone 46, gas discharge conduit 54 and enters the second cyclone 56 where any particulate matter is removed and returned to the polymerization zone through dip tube 67. A recycle stream of gas, now substantially free of particulate matter, exists the cyclone 56 and is supplied through recycle line 58, compressor 60 and heat exchanger 62 into the plenum zone 42 at the bottom of the second reactor.

Final polymer product, being continuously formed in the polymerization zone 44, is continuously withdrawn through final product removal line 66 for subsequent purge of process gases and packaging or other downstream operations.

The final polyolefin product produced by the system is dependent upon a wide range of variables which may be separately adjusted in the two reactor systems, including compositions of the first and second fluidizing mediums, the first and second polymerization catalysts, the temperatures, pressures, flow rates and other factors maintained in the polymerization zones of the first and second reactor. Thus, the gas phase polymerization system of the present invention has the operating flexibility to produce a broad spectrum of polyolefin polymers with varying physical properties.

The gas phase polymerization system of the present invention also has been designed to incorporate broad operating flexibility in addition to the capability of producing a broad range of polyolefin products. Although the normal mode of operation will be a stage-wise polymerization of alpha-olefins utilizing multiple reactors to produce a single, final polyolefin product, the system also has the capability of simultaneously producing two distinct polyolefin polymer products, one being produced in each of the two reactors, which can then be segregated and processed separately or blended together to form a composite polyolefin polymer. Operating in a segregated mode, each of the two reactors is the principal component of a separate gas phase polymerization system. Thus, both reactors may produce identical products, both reactors may produce different products or both reactors may be used in series to produce a sequentially polymerized product containing specific characteristics.

The following examples are submitted as representative of the types of products which may be expected to be produced by a dual vertically stacked reactor system in accordance with the present invention:

Example 1

A co-polymer of ethylene and 4-methyl pentane-1 having a density of 0.919 g/cc and a melt index of approximately 0.19 g/10 minutes can be produced with the appropriate catalyst and the following typical conditions. The fluidizing medium introduced into the first reactor would contain 44 mol percent ethylene, 53 mol percent hydrogen and 10 mol percent 4-methyl pentane-1. The operating pressure in the first reactor will be approximately 142 psig with a reaction temperature of approximately 167 degrees Fahrenheit. The co-polymer produced in the first reactor is conveyed through the intermediate product transfer line 70 into the second polymerization zone 44 of reactor 40. The fluidizing medium introduced into reactor 40 would contain approximately 53 mol percent ethylene, 42 mol percent hydrogen and 5 mol percent 4-methyl pentane-1. The operating pressure in reactor 40 will be approximately 113 psig with a reaction temperature of approximately 120 degrees Fahrenheit.

Example 2

Special product properties not attainable from a single reactor are attainable in a single product synthesized in the stacked reactors of the gas phase polymerization system of the present invention. For example, the combined properties of high density polyethylene homo- and co-polymers provide the stiffness and toughness desirable in many product applications.

Synthesis of such a high density polyethylene can be achieved with a fluidizing medium composition of 97 weight percent ethylene and 3 weight percent hydrogen introduced to reactor 10. The operating pressure and temperature in reactor 10 will be approximately 300 psig and 212 degrees Fahrenheit respectively. The polymer produced in reactor 10 will be a nominal 0.963 g/cc density and 16 melt index homo-polymer and will flow to polymerization zone 44 of reactor 40 through the intermediate product transfer line 70. Reactor 40 will have a fluidizing medium composition of approximately 80 weight percent ethylene, 19 weight percent propylene and 1 weight percent hydrogen. Reactor 40 will operate at approximately the same reactor pressure as reactor 10, but at a slightly lower temperature to avoid agglomeration of the product produced in reactor 40. Reactor 40 will produce a 0.949 g/cc density and 15 melt index co-polymer. The composite properties of the polyolefin product withdrawn through final product transfer means 66 will be a nominal 0.956 g/cc density and 15 melt index.

Example 3

In the synthesis of a polypropylene block co-polymer in the gas phase polymerization system of the present invention, the multiple reactors receive the same composition fluidizing medium of about 92 weight percent propylene and 8 weight percent ethylene. Hydrogen is included in the fluidizing medium feed in a 0.02 mol ratio to the propylene for molecular weight control of the polyolefin polymer. The operating conditions in reactor 10 would be approximately 400 psig and 165 degrees Fahrenheit. The polyolefin polymer, catalyst lo and unreacted fluidizing medium would flow from reactor 10 into reactor 40 through the intermediate product transfer means 70. The operating conditions in reactor 40 would be approximately 225 psig and 140 degrees Fahrenheit. The differential pressure between reactor 10 and reactor 40 will facilitate the transfer from polymerization zone 14 of reactor 10 to polymerization zone 44 of reactor 40. Depending on the catalyst used, these conditions will produce a polyolefin polymer with approximately a 0.90 g/cc density and 4.0 melt index.

The foregoing disclosure and description of the invention is illustrative thereof and various changes in the size, shape, and materials of construction, may be made without departing from the scope of the invention.

What is claimed is:

1. A dual reactor apparatus for gas phase polymerization of alpha-olefins, said apparatus comprising:

first and second generally cylindrical reactors, said first reactor being positioned above said second reactor, each of said first and second reactors comprising a plenum zone in the lower portion thereof, a polymerization zone above said plenum zone and a disengaging zone above said polymerization zone, and having gas distribution means being provided between, and separating, said plenum zone and said polymerization zone in each reactor, said gas distribution means comprising a fixed, substantially conical, distribution plate pointing upwardly, said plate having a plurality of individual gas ports therein which ports comprise the only means for gas flow from said plenum zone to said polymerization zone and including means for controlling the orientation of flow of gas through each of said individual ports, whereby the flow of gas through said distribution plate and into said polymerization zone may be controlled for desired distribution;

first and second catalyst supply means for supplying first and second polymerization catalysts to, respectively, said polymerization zones of said first and second reactors;

first and second gas supply means for supplying, respectively, first and second polymerizable gas mixtures comprising one or more alpha-olefins to, respectively, said plenum zones of said first and second reactors;

first and second gas recycle means for withdrawing first and second streams comprising primarily unreacted polymerizable gas from, respectively, the upper portions of said disengaging zones of said first and second reactors and supplying said withdrawn first and second stream as, respectively, first and second recycle streams to, respectively, said plenum zones of said first and second reactors;

intermediate product transfer means for withdrawing intermediate polymer product from said polymerization zone of said first reactor and supplying said withdrawn intermediate polymer product to said polymerization zone of said second reactor; and final product transfer means for withdrawing final polymer product from said polymerization zone of said second reactor.

2. The apparatus according to claim 1 wherein said intermediate product transfer means comprises a straight, substantially vertical cylindrical passage having its inlet located in said polymerization zone of said first reactor and its outlet located in said polymerization zone of said second reactor and having a transfer control means located between said inlet and outlet for controlling the flow of intermediate polymer product through said intermediate product transfer means.

3. The apparatus according to claim 1 wherein said first and second reactor vessels are of substantially uniform internal diameter throughout substantially their entire vertical lengths.

4. The apparatus according to claim 1 comprising additionally a fines separation means, said fines separation means comprising:

first and second cyclone separators for receiving first and second gas streams from, respectively, said disengaging zones of said first and second reactors and separating fines therefrom, and first and second dip tubes extending downwardly from, respectively, said first and second cyclones and into polymerization zones of, respectively, said first and second reactors, whereby fines separated from said first and second gas streams in said first and second cyclones may be conveyed through said first and second dip tubes into said polymerization zones of said first and second reactors.

5. The apparatus according to claim 4 wherein said dip tubes are of substantially uniform diameter and are substantially vertical along a portion of their length and are inclined from the vertical along another portion of their length and comprising additionally a spiral conveyor disposed inside each of said first and second dip tubes and connected to a rotatable power means, said spiral conveyors having sufficient flexibility to permit them to rotate about their longitudinal axes throughout both the vertical and inclined portions of said dip tubes, whereby said spiral conveyors may be made to rotate continually to assist in conveying fines in said first and second dip tubes to said polymerization zones, thereby preventing said first and second dip tubes from plugging.

6. A dual reactor apparatus for gas phase polymerization of alpha-olefins, said apparatus comprising:

a first, generally cylindrical, reactor vessel, said vessel being of substantially uniform internal diameter throughout substantially its entire vertical length and comprising a first plenum zone in the lower portion thereof, a first polymerization zone located above said first plenum zone and a first disengaging zone located above said first polymerization zone, and having a first gas distribution means provided between said first plenum zone and said first polymerization zone;

first gas supply means for supplying a first polymerizable gas mixture comprising one or more alpha-olefins to said first plenum zone for flow upwardly through said first reactor;

a fixed, substantially conical, gas distribution plate disposed in said first reactor vessel between said first plenum zone and said first polymerization zone, said conical gas distribution plate having its apex pointing upwardly and having a plurality of individual gas ports therein which ports comprise the only means for gas to flow from said first plenum zone into said first polymerization zone and having means for controlling the orientation of flow of gas through each of said individual ports, whereby the flow of said first polymerizable gas mixture may be controlled for desired distribution of said gas mixture into said first polymerization zone;

first catalyst supply means for supplying a first polymerization catalyst to said first polymerization zone;

first recycle means for withdrawing a first stream comprising primarily unreacted polymerizable gas from the upper portion of said first disengaging zone and supplying a first recycle stream to said first plenum zone;

a second generally cylindrical reactor vessel disposed below, and substantially in vertical alignment with said first reactor vessel, said second reactor vessel being of substantially uniform internal diameter throughout substantially its entire vertical length and comprising a second plenum zone in the lower portion of said second reactor, a second polymerization zone disposed above said second plenum zone and a second disengaging zone disposed above said second polymerization zone, and having a second gas distribution means provided between said second plenum zone and said second polymerization zone;

second gas supply means for supplying a second polymerizable gas mixture comprising one or more alpha-olefins to said second plenum zone for flow upwardly through said second reactor;

a fixed, substantially conical, gas distribution plate disposed in said second reactor vessel between said second plenum zone and said second polymerization zone, said conical gas distribution plate having its apex pointing upwardly and having a plurality of individual gas ports therein which ports comprise the only means for gas to flow from said second plenum zone into said second polymerization zone and having means for controlling the orientation of flow of gas through each of said individual ports, whereby the flow of said second polymerizable gas mixture may be controlled for desired distribution of said gas mixture into said second polymerization zone;

second catalyst supply means for supplying a second polymerization catalyst to said second polymerization zone;

second recycle means for withdrawing a second stream comprising primarily unreacted polymerizable gas from the upper portion of said second disengaging zone and supplying a second recycle stream to said second plenum zone;

intermediate product transfer means for continuously withdrawing an intermediate polyolefin polymer product from said first polymerization zone and supplying said intermediate polyolefin polymer product to said second polymerization zone; and final product transfer means for continuously withdrawing a final polyolefin polymer product from said second polymerization zone.

7. The apparatus according to claim 6 wherein said intermediate product transfer means comprises a passage having its inlet located in said first polymerization zone and its outlet located in said second polymerization zone and having a transfer control means located between said inlet and said outlet for controlling the flow of intermediate polyolefin polymer product through said intermediate product transfer means.

8. The apparatus according to claim 7 wherein said intermediate product transfer means extends substantially vertically from said first polymerization zone, through said first plenum zone, into said second disengaging zone and terminates in said second polymerization zone.

9. The apparatus according to claim 6 comprising additionally first and second fines separation means, said first fines separation means comprising,
a first gas discharge conduit for withdrawing a first stream comprising unreacted polymerizable gas from said first disengaging zone,
a first cyclone for receiving said withdrawn first gas stream from said first gas discharge conduit,
a first dip tube for returning fines separated from said first withdrawn gas stream to said first polymerization zone, and
a first recycle line for transmitting said first withdrawn gas stream, substantially free of fines, from said first cyclone to said first plenum zone as a first recycle stream; and said second fines separation means comprising,
a second gas discharge conduit for withdrawing a second stream comprising unreacted polymerizable gas from said second disengaging zone,
a second cyclone for receiving said withdrawn second gas stream from said second gas discharge conduit,
a second dip tube for returning fines separated from said withdrawn second gas stream to said second polymerization zone, and
a second recycle line for transmitting said withdrawn second gas stream, substantially free of fines, from said second cyclone to said second plenum zone as a second recycle stream.

10. The apparatus according to claim 9 wherein said dip tubes are of substantially uniform diameter and are substantially vertical along a portion of their length and are inclined from the vertical along another portion of their length and comprising additionally a spiral conveyor disposed inside each of said first and second dip tubes, each said spiral conveyor being connected to a rotatable power means, said spiral conveyors having sufficient flexibility to permit them to rotate about their longitudinal axes throughout both the vertical and inclined portions of said dip tubes whereby said spiral conveyors may be made to rotate continuously to assist in conveying fines in said first and second dip tubes to, respectively, said first and second polymerization zones.

11. A dual reactor apparatus for gas phase polymerization of alpha-olefins, said apparatus comprising:
first and second generally cylindrical reactors, said first reactor being positioned above said second reactor,
each of said first and second reactors comprising a plenum zone in the lower portion thereof, a polymerization zone above said plenum zone and a disengaging zone above said polymerization zone, and having gas distribution means being provided between, and separating, said plenum zone and said polymerization zone in each reactor,
said gas distribution means comprising a fixed, substantially conical, distribution plate pointing upwardly, said plate having a plurality of individual gas ports therein which ports comprise the only means for gas flow from said plenum zone to said polymerization zone and including means for controlling the orientation of flow of gas through each of said individual ports, whereby the flow of gas through said distribution plate and into said polymerization zone may be controlled for desired distribution;
first and second catalyst supply means for supplying first and second polymerization catalysts to, respectively, said polymerization zones of said first and second reactors, said first and second catalyst supply means comprising a plurality of catalyst supply nozzles, each said catalyst supply nozzle having a generally cylindrical opening for the introduction of catalyst into a polymerization zone of said reactors, said opening being selectively closeable by an extendable and retractable slide wire, said wire having substantially the same outside diameter as the inside diameter of said generally cylindrical opening, whereby any catalyst in said cylindrical opening of said nozzle will be displaced by said slide wire, rendering said nozzle self-cleaning and non-plugging;

first and second gas supply means for supplying, respectively, first and second polymerizable gas mixtures comprising one or more alpha-olefins to, respectively, said plenum zones of said first and second reactors;

first and second gas recycle means for withdrawing first and second streams comprising primarily unreacted polymerizable gas from, respectively, the upper portions of said disengaging zones of said first and second reactors and supplying said withdrawn first and second stream as, respectively, first and second recycle streams to, respectively, said plenum zones of said first and second reactors;

intermediate product transfer means for withdrawing intermediate polymer product from said polymerization zone of said first reactor and supplying said withdrawn intermediate polymer product to said polymerization zone of said second reactor; and final product transfer means for withdrawing final polymer product from said polymerization zone of said second reactor.

12. A dual reactor apparatus for gas phase polymerization of alpha-olefins, said apparatus comprising:

a first, generally cylindrical, reactor vessel, said vessel being of substantially uniform internal diameter throughout substantially its entire vertical length and comprising a first plenum zone in the lower portion thereof, a first polymerization zone located above said first plenum zone and a first disengaging zone located above said first polymerization zone, and having a first gas distribution means provided between said first plenum zone and said first polymerization zone;

first gas supply means for supplying a first polymerizable gas mixture comprising one or more alpha-olefins to said first plenum zone for flow upwardly through said first reactor;

a fixed, substantially conical, gas distribution plate disposed in said first reactor vessel between said first plenum zone and said first polymerization zone, said conical gas distribution plate having its apex pointing upwardly and having a plurality of individual gas ports therein which ports comprise the only means for gas to flow from said first plenum zone into said first polymerization zone and having means for controlling the orientation of flow of gas through each of said individual ports, whereby the flow of said first polymerizable gas mixture may be controlled for desired distribution of said gas mixture into said first polymerization zone;

first catalyst supply means for supplying a first polymerization catalyst to said first polymerization zone, said first catalyst supply means comprising a plurality of catalyst supply nozzles, each said catalyst supply nozzle having a substantially cylindrical discharge orifice for the introduction of catalyst into said first polymerization zone, each said discharge orifice being selectively closeable by an extendable and retractable slide wire, said wire having substantially the same outside diameter as the inside diameter of said cylindrical discharge orifice, whereby any catalyst in said cylindrical discharge orifice will be displaced by said slide wire, rendering said nozzles self-cleaning and non-plugging;

first recycle means for withdrawing a first stream comprising primarily unreacted polymerizable gas from the upper portion of said first disengaging zone and supplying a first recycle stream to said first plenum zone;

a second generally cylindrical reactor vessel disposed below, and substantially in vertical alignment with said first reactor vessel, said second reactor vessel being of substantially uniform internal diameter throughout substantially its entire vertical length and comprising a second plenum zone in the lower portion of said second reactor, a second polymerization zone disposed above said second plenum zone and a second disengaging zone disposed above said second polymerization zone, and having a second gas distribution means provided between said second plenum zone and said second polymerization zone;

second gas supply means for supplying a second polymerizable gas mixture comprising one or more alpha-olefins to said second plenum zone for flow upwardly through said second reactor;

a fixed, substantially conical, gas distribution plate disposed in said second reactor vessel between said second plenum zone and said second polymerization zone, said conical gas distribution plate having its apex pointing upwardly and having a plurality of individual gas ports therein which ports comprise the only means for gas to flow from said second plenum zone into said second polymerization zone and having means for controlling the orientation of flow of gas through each of said individual ports, whereby the flow of said second polymerizable gas mixture may be controlled for desired distribution of said gas mixture into said second polymerization zone;

second catalyst supply means for supplying a second polymerization catalyst to said second polymerization zone, said second catalyst supply means comprising a plurality of catalyst supply nozzles, each said catalyst supply nozzle having a substantially cylindrical discharge orifice for the introduction of catalyst into said second polymerization zone, each said discharge orifice being selectively closeable by an extendable and retractable slide wire, said wire having substantially the same outside diameter as the inside diameter of said cylindrical discharge orifice, whereby any catalyst in said cylindrical discharge orifice will be displaced by said slide wire, rendering said nozzles self-cleaning and non-plugging;

second recycle means for withdrawing a second stream comprising primarily unreacted polymerizable gas from the upper portion of said second disengaging zone and supplying a second recycle stream to said second plenum zone;

intermediate product transfer means for continuously withdrawing an intermediate polyolefin polymer product from said first polymerization zone and supplying said intermediate polyolefin polymer product to said second polymerization zone; and final product transfer means for continuously withdrawing a final polyolefin polymer product from said second polymerization zone.

* * * * *